United States Patent [19]

Lee

[11] Patent Number: 5,612,743
[45] Date of Patent: Mar. 18, 1997

[54] METHOD FOR ENCODING A VIDEO SIGNAL USING FEATURE POINT BASED MOTION ESTIMATION

[75] Inventor: Min-Sup Lee, Seoul, Rep. of Korea

[73] Assignee: Daewoo Electronics Co. Ltd., Seoul, Rep. of Korea

[21] Appl. No.: 498,553

[22] Filed: Jul. 5, 1995

[30] Foreign Application Priority Data

Apr. 29, 1995 [KR] Rep. of Korea ............ 95-10585

[51] Int. Cl.$^6$ .................................................. H04N 7/133
[52] U.S. Cl. ............................ 348/409; 348/420; 382/243
[58] Field of Search .................................. 348/401, 409, 348/415, 416, 420, 699, 700, 402; 382/243, 236, 238

[56] References Cited

U.S. PATENT DOCUMENTS

| | | | |
|---|---|---|---|
| 5,150,432 | 9/1992 | Ueno et al. | 348/438 |
| 5,237,410 | 8/1993 | Inoue | 348/409 |
| 5,247,590 | 9/1993 | Fukuhara et al. | 382/243 |
| 5,373,567 | 12/1994 | Takahashi et al. | 382/243 |
| 5,546,129 | 8/1996 | Lee | 348/416 |

Primary Examiner—Amelia Au
Attorney, Agent, or Firm—Anderson Kill & Olick P.C.

[57] ABSTRACT

A method for adaptively selecting feature points according to motions of objects between the current frame and the reference frame, comprising: detecting a motion vector for each pixel in the current frame between the current frame and the reference frame; providing a pixel value from the reference frame based on the motion vector for each pixel in the current frame; subtracting the pixel value provided from the reference frame from a pixel value of said each pixel of the current frame to thereby provide a differential pixel value; comparing the differential pixel value with a threshold value TH and selecting regions having their respective differential pixel values larger than the threshold value TH; shifting the pixels within the selected regions to positions indicated by their respective motion vectors to thereby provide shifted regions; detecting edge points from the reference frame; determining processing regions from the shifted regions, wherein the shifted regions are overlapped with a portion of the edge points; generating a first grid on the reference frame and a second grid for each of the processing regions, wherein the second grid is formed by a portion of grid points of the first grid and newly added grid points; and selecting, as the feature points, a multiplicity of pixels in the reference frame based on the first and the second grids and the edge points.

4 Claims, 8 Drawing Sheets

FIG. 7

METHOD FOR ENCODING A VIDEO SIGNAL USING FEATURE POINT BASED MOTION ESTIMATION

FIELD OF THE INVENTION

The present invention relates to a method for encoding a video signal; and, more particularly, to a method which is capable of effectively encoding the video signal by adaptively selecting feature points according to the motion of an object.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and a previous frame, and predicting the current frame according to the motion flow of the object to produce an error signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

The two-dimensional DCT, which reduces or makes use of spatial redundancies between image data, converts a block of digital image data, for example, a block of 8×8 pixels, into a set of transform coefficient data. This technique is described in, e.g., Chen and Pratt, "Scene Adaptive Coder", *IEEE Transactions on Communications*, COM-32, No. 3(March 1984). By processing such transform coefficient data with a quantizer, zigzag scanning and VLC, the amount of data to be transmitted can be effectively compressed.

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object: one is a block-by-block estimation and the other is a pixel-by-pixel approach.

In the block-by-block motion estimation, a block in a current frame is compared with blocks in its previous frame until a best match is determined. From this, an interframe displacement vector(representing how much the block of pixels has moved between frames) for the whole block can be estimated for the current frame being transmitted. However, in the block-by-block motion estimation, poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined for each and every pixel, it is virtually impossible to transmit all of the motion vector data to a receiver.

One of the techniques introduced to ameliorate the problem of dealing with the surplus or superfluous transmission data resulting from the pixel-by-pixel approach is a feature point-based motion estimation method.

In the feature point-based motion estimation technique, motion vectors for a set of selected pixels, i.e., feature points, are transmitted to a receiver, wherein the feature points are defined as pixels of a previous frame or a current frame capable of representing a motion of an object so that the entire motion vectors for the pixels in the current frame can be recovered or approximated from those of the feature points at the receiver. In an encoder which adopts the motion estimation technique based on feature points as disclosed in a commonly owned copending application, U.S. Ser. No. 08/367, 520, entitled "Method and Apparatus for Encoding a Video Signal Using Pixel-by-Pixel Motion Estimation", a number of feature points are first selected from all of the pixels contained in the previous frame. Then, motion vectors for the selected feature points are determined through the use of a conventional block matching technique, wherein each of the motion vectors represents a spatial displacement between one feature point in the previous frame and a corresponding matching point, i.e., a most similar pixel, in the current frame. Specifically, the matching point for each of the feature points is searched in a search region within the current frame, wherein the search region is defined as a region of a predetermined area which encompasses the position of the corresponding feature point. Thereafter, the entire motion vectors for all of the pixels in the current frame are determined based on the motion vectors of the feature points.

Since, however, in the above-mentioned feature point based motion estimation technique, feature points are determined without due regard paid to the details of the motion which may vary between objects, it may not be always able to adequately estimate the motion or accurately reproduce the image.

SUMMARY OF THE INVENTION

It is, therefore, a primary object of the invention to provide an improved video signal encoding method which is capable of effectively encoding the video signal by adaptively selecting feature points according to the motion of objects.

In accordance with the present invention, there is provided a method, for use in a video signal encoder for encoding a digital video signal based on a feature point-based motion estimation technique, said digital video signal having a plurality of frames including a current frame and a reference frame, for adaptively selecting feature points according to motions of objects between the current frame and the reference frame, comprising: (a) detecting a motion vector for each pixel in the current frame between the current frame and the reference frame; (b) providing a pixel value from the reference frame based on the motion vector for each pixel in the current frame; (c) subtracting the pixel value provided from the reference frame from a pixel value of said each pixel of the current frame to thereby provide a differential pixel value; (d) comparing on a pixel-by-pixel basis the differential pixel value with a threshold value TH and selecting one or more regions, each of the selected regions consisting of the pixels having their respective differential pixel values larger than the threshold value TH; (e) shifting the pixels within the selected regions to positions indicated by their respective motion vectors to thereby provide shifted regions; (f) detecting edge points from the reference frame; (g) determining none or more processing regions from the shifted regions, wherein the processing regions are the shifted regions which overlap with a portion of the edge points; (h) generating a first grid on the reference frame and generating a second grid for each of the processing regions, wherein the second grid is formed by a portion of grid points of the first grid and newly added grid points, each of the newly added grid points being positioned at the center of a pair of neighboring grid points of the first grid in a horizontal or a vertical direction; and (i) selecting, as the feature points, a multiplicity of pixels in the reference frame based on the first and the second grids and the edge points.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
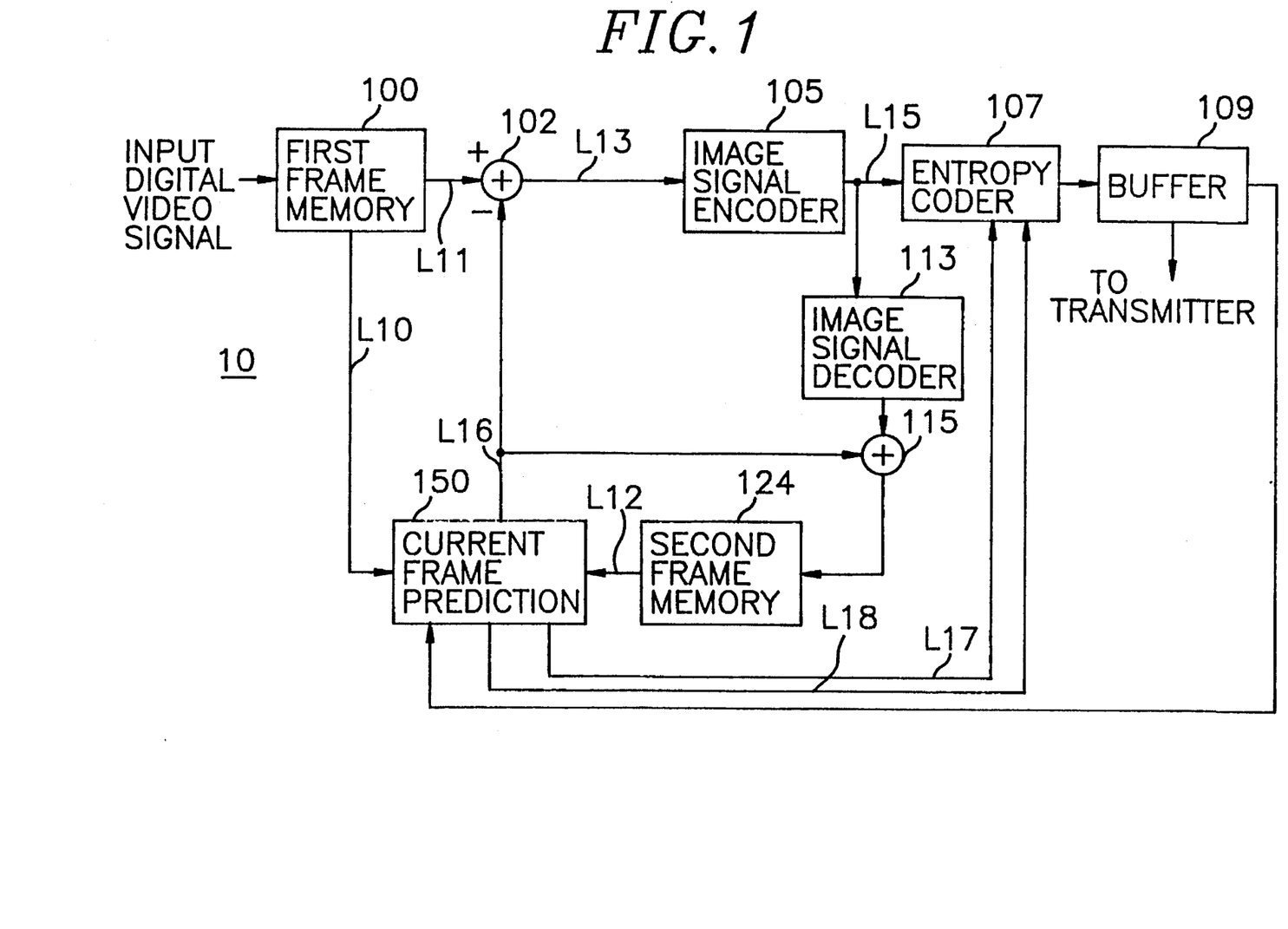
FIG. 1 is a block diagram of a video signal encoding apparatus in accordance with the present invention.

Referring to FIG. 1, there is shown a block diagram of a video signal encoding apparatus 10 in accordance with the present invention. An input digital video signal is stored as a current frame signal in a first frame memory 100 which is connected to a subtractor 102 through a line L11 and to a current frame prediction block 150 through a line L10.

At the current frame prediction block 150, a current frame signal on the line L10 retrieved from the first frame memory 100 and a previous or a reference frame signal on a line L12 from a second frame memory 124 are processed to predict the current frame on a pixel-by-pixel basis to generate a predicted current frame signal onto a line L16, a set of motion vectors for feature points onto a line L17 and grid information onto a line L18 which represents the positions of the regions having the sporadic and local movement of the objects and thereby requiring a detailed motion compensation. Details of the current frame prediction block 150 will be described with reference to FIGS. 2 and 9.

The predicted current frame signal on the line L16 is subtracted from a current frame signal on a line L11 at the subtractor 102, and the resultant data, i.e., an error signal denoting the differential pixel values between the current frame and the predicted current frame, is dispatched to an image signal encoder 105, wherein the error signal is encoded into a plurality of sets of quantized transform coefficients using, e.g., a DCT and any of the known quantization methods.

Thereafter, the quantized transform coefficients are transmitted to an entropy coder 107 and an image signal decoder 113. At the entropy coder 107, the quantized transform coefficients from the image signal encoder 105, the motion vectors on the line L17 and the grid information on line L18 are coded together by using, e.g., a variable length coding technique; and transmitted to a transmitter(not shown) at a constant transmission rate through a buffer 109 for the transmission thereof.

In the meantime, the image signal decoder 113 converts the sets of quantized transform coefficients from the image signal encoder 105 back into a reconstructed error signal by employing an inverse quantization and an inverse discrete cosine transform.

The reconstructed error signal from the image signal decoder 113 and the predicted current frame signal on the line L16 from the current frame prediction block 150 are combined at an adder 115 to thereby provide a reconstructed current frame signal to be stored in the second frame memory 124 as a reference frame for a next frame. Reconstruction of the error signal is required in order for the encoder to monitor the behavior of the decoder in a receiver to thereby prevent the current frame signal reconstructed at the encoder from diverging from that of the decoder in the receiver.

Figure 2:
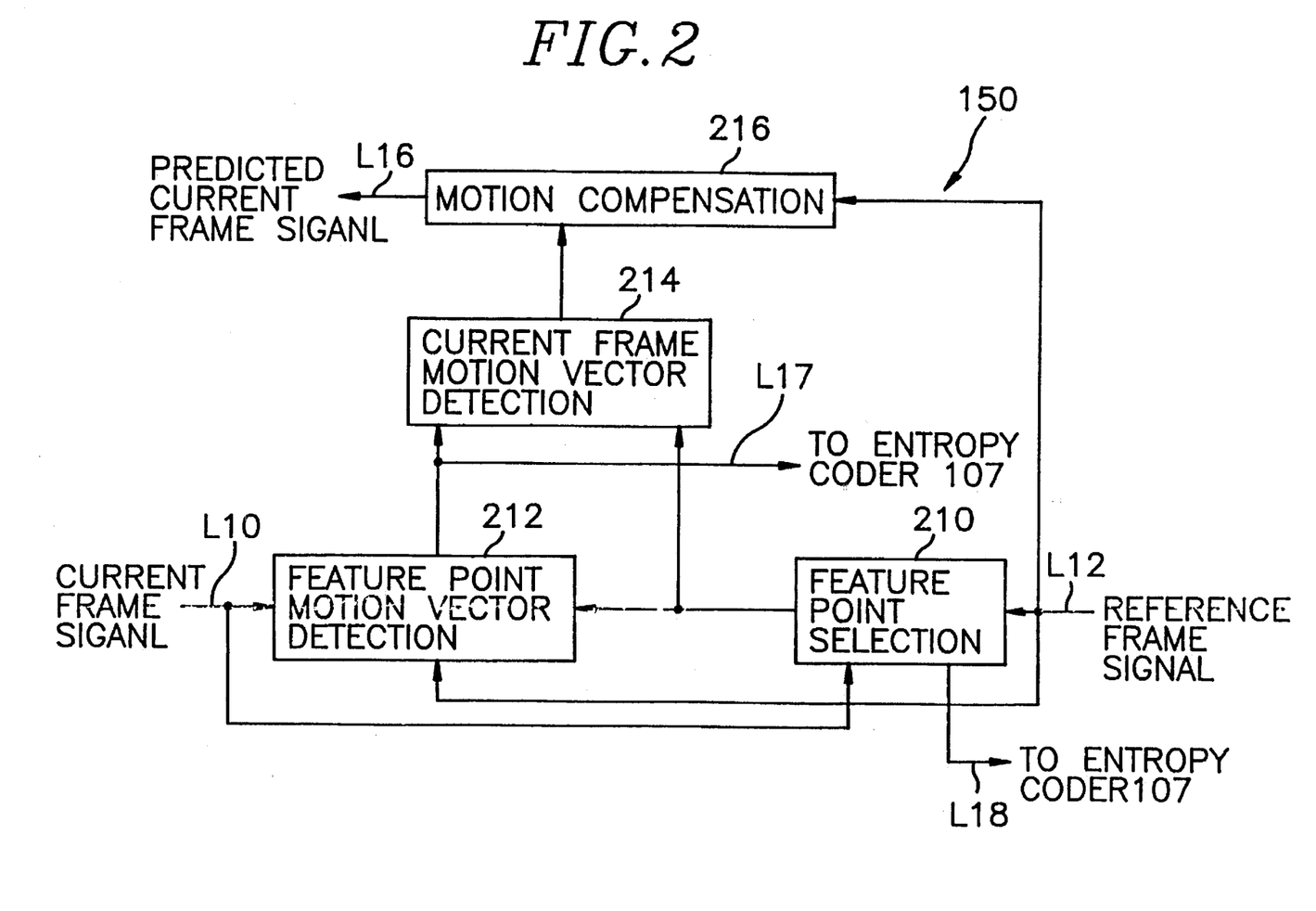
FIG. 2 shows a detailed block diagram of the current frame prediction block of FIG. 1.

Referring to FIG. 2, there are illustrated details of the current frame prediction block 150 shown in FIG. 1. As shown in FIG. 2, a reference frame signal on the line L12 from the second frame memory 124 is inputted to a feature point selection block 210, a feature point motion vector detection block 212 and a motion compensation block 216.

At the feature point selection block 210, a number of feature points are selected among the pixels contained in the reference frame. The feature points are defined as pixels which are capable of representing the motions of objects in the frame.

Figure 3:
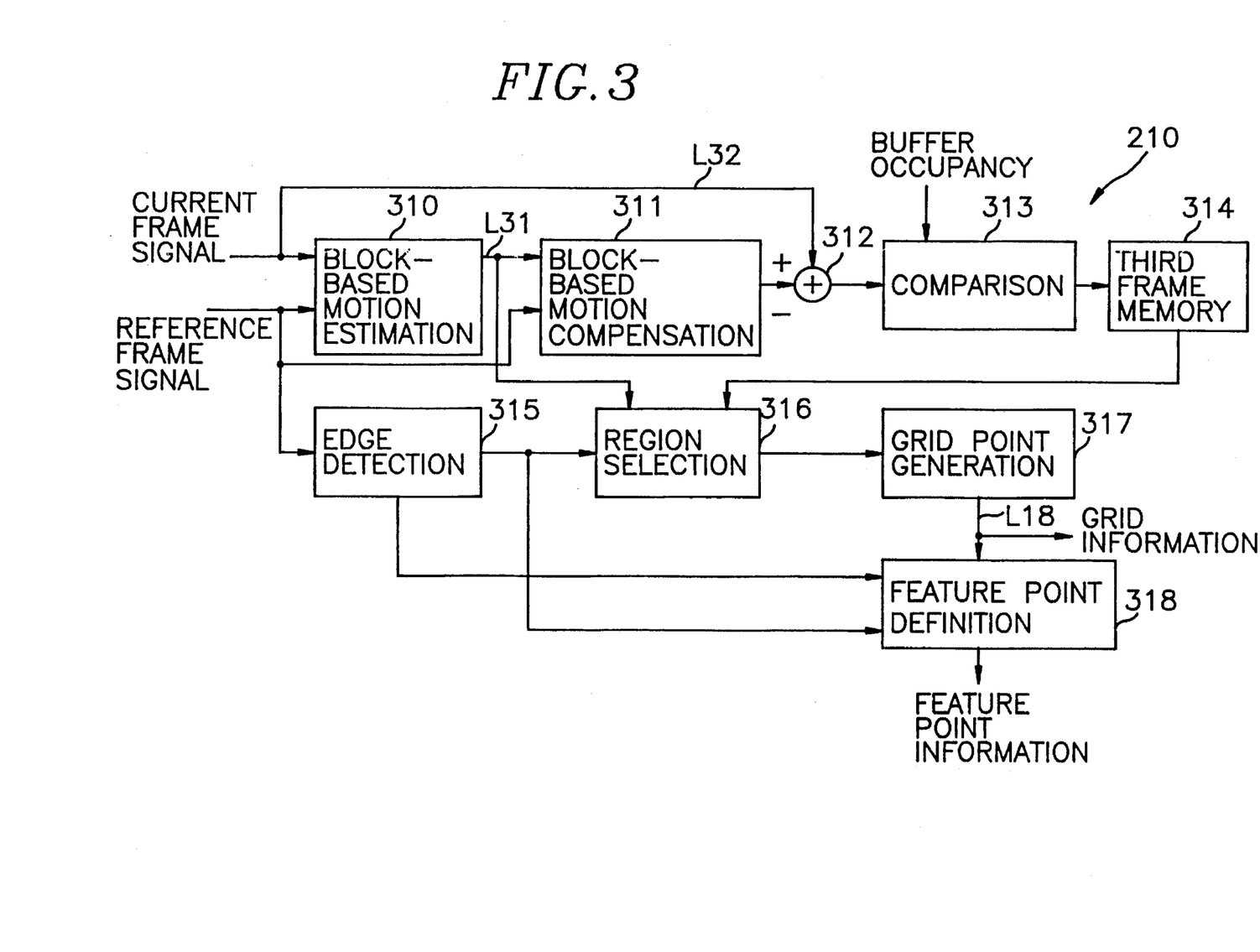
FIG. 3 presents a detailed block diagram of the feature point selection block of FIG. 2.

Referring now to FIG. 3, there is provided a detailed block diagram of the feature point selection block 210 shown in FIG. 2. The current frame signal on the line L10 from the first frame memory 100 shown in FIG. 1 is inputted to a block-based motion vector estimation block 310 and an adder 312, while the reference frame signal on the line L12 from the second frame memory 124 shown in FIG. 1 is inputted to the block-based motion vector estimation block 310, a block-based motion compensation block 311 and an edge detection block 315.

The block-based motion vector estimation block 310 detects, through the use of the conventional block matching technique well known in the art, a motion vector representing a spatial displacement between each search block in the current frame and a most similar block thereto in the reference frame and provides the motion vector via a line L31 to the block-based motion compensation block 311 and a region selection block 316. The motion vector for a search block is assigned as the motion vectors of the pixels included in the search block. The block-based motion compensation block 311 retrieves pixel values from the second frame memory 124 shown in FIG. 1 by using the motion vectors for all of the pixels in the current frame, thereby providing a prediction signal to the subtractor 312.

Figure 4:
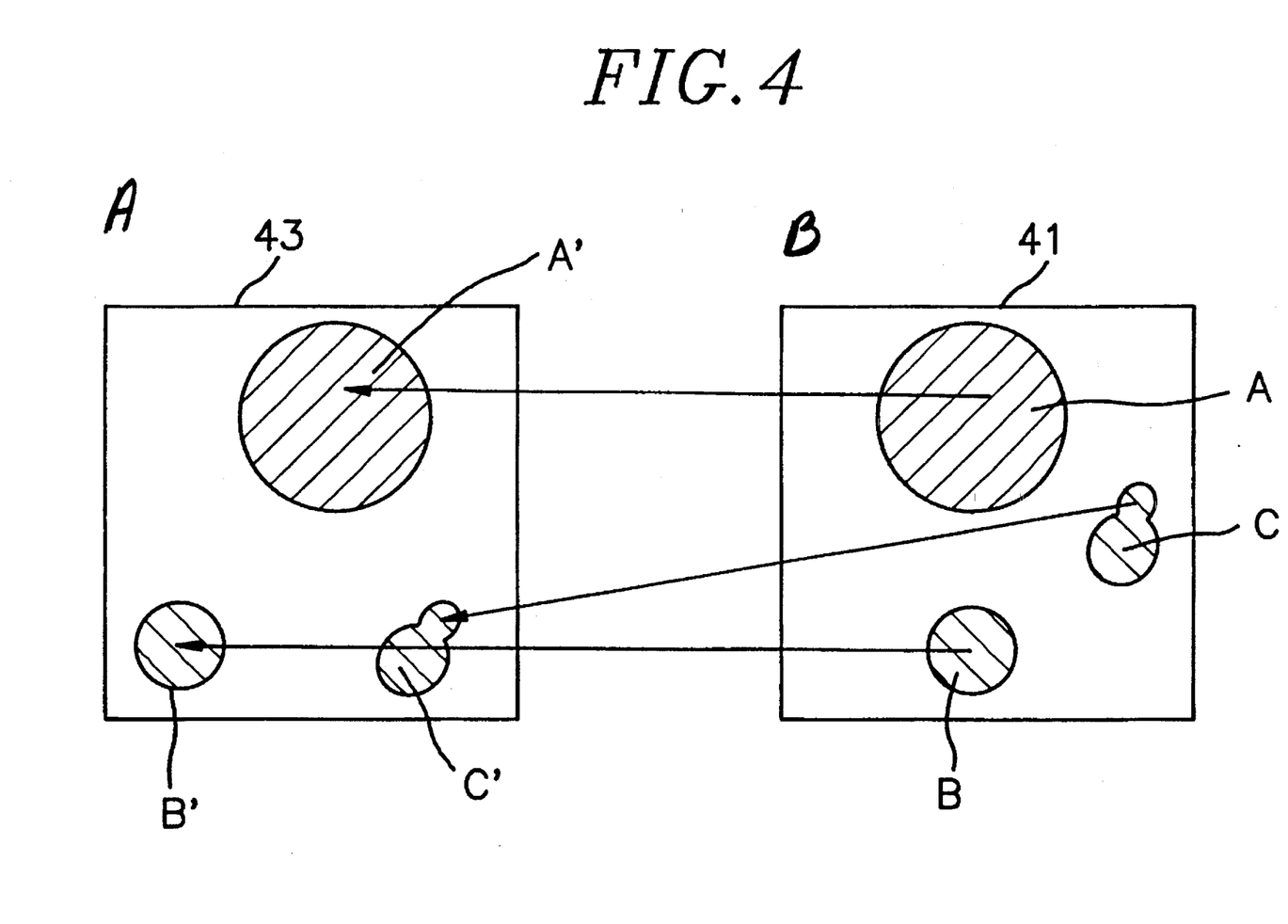
FIG. 4 provide the translation of the current frame signal based on the motion vectors.

The prediction signal is subtracted from the current frame signal at the subtractor 312, and the resultant data, i.e., a difference signal denoting the differential pixel values between the current frame signal and the prediction signal, is dispatched to a comparison block 313. The comparison block 313 compares on a pixel-by-pixel basis each of the differential pixel values included in the difference signal with a threshold value TH. The threshold value TH may be predetermined or determined adaptively according to the buffer occupancy, i.e., the amount of data stored in the buffer 109 shown in FIG. 1. If a differential pixel value is less than the threshold value TH, it is set to the conversion value 0. Otherwise, the differential pixel value is set to the conversion value 1. The conversion values are provided to a third frame memory 314. In FIG. 4, an error frame 41 formed by the conversion values stored in the third frame memory 314 is exemplarily shown. There are two distinct zones in the error frame 41: one is the regions(e.g, A, B and C) with the conversion value 1; and the other, with the conversion value 0.

Referring back to FIG. 3, an edge detection block 315, as well known in the art, detects edge points in the reference frame by using a conventional gradient operator, e.g., a sobel operator. For instance, directional gradients, i.e., horizontal and vertical gradients $G_x(x,y)$ and $G_y(x,y)$ at a pixel location$(x,y)$ are calculated by using horizontal and vertical sobel operators, and a gradient magnitude $g(x,y)$ at the pixel location$(x,y)$ may be obtained as:

$$g(x, y)=|G_x(x, y)|+|G_y(x, y)|$$

And then the edge points in the reference frame are detected by comparing the gradient magnitude $g(x,y)$ for each pixel in the reference frame with a predetermined threshold value Te. That is, the pixel location $(x,y)$ is an edge point if $g(x,y)$ exceeds Te.

Subsequently, an edge signal $eg(x,y)$ denoting the locations of the edge points is provided to the region selection block 316 and the gradient magnitude $g(x,y)$ for each edge point along with the edge signal $eg(x,y)$ is provided to a feature point definition block 318.

Figure 5:
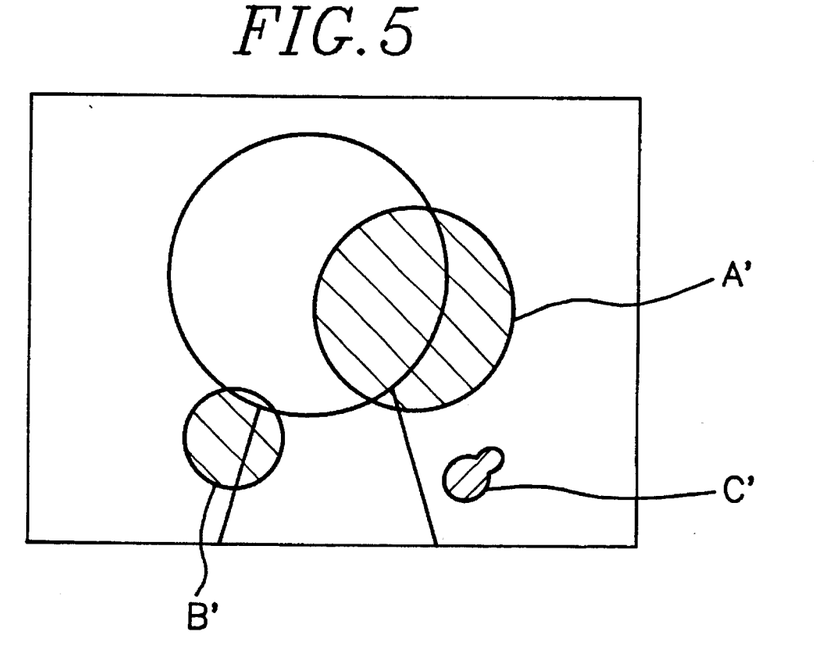
FIG. 5 depicts the overlap of the regions having the large differential pixel value with edges in the reference frames.

In response to the motion vectors from the block-based motion vector estimation block 310, the region selection block 316 moves each of the pixels having the conversion value of 1, i.e., the pixels corresponding to the regions A, B and C of the error frame 41 shown in FIG. 4, to a location indicated by the motion vector thereof, thereby generating a translated error frame 43. Each of the regions A, B and C is shifted to a region A', B' or C', respectively. Thereafter, as shown in FIG. 5, processing regions are selected based on the positional relationship between the regions A', B' and C' having the conversion value 1 and the locations of the edge points provided from the edge detection block 315. For instance, the regions A' and B', which overlap with a portion of the edge points, are the processing regions determined by the region selection block 316. The region C' is excluded from the selection of the processing region because it does not overlap with any of the edge points in the reference frame. Processing region information denoting the positions of the processing region is provided to a grid point generation block 317.

Figure 6:
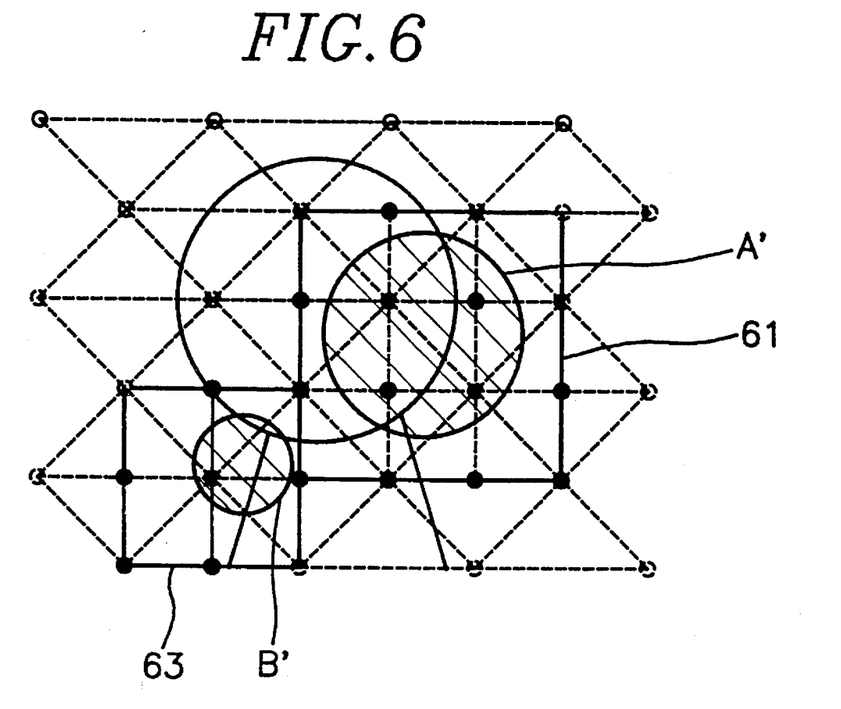
FIG. 6 explains the adaptive grid generation process in the selected region.

Returning now to FIG. 3, the grid point generation block 317 generates a first grid on the reference frame and, in response to the processing region information, a second grid for each of the processing regions, wherein the density of grid points of the second grid is greater than that of the first grid. In the preferred embodiment of the invention, a hexagonal grid is formed on the entire frame first; and a triangular grid is constituted for each of the processing regions, wherein the triangular grid is of a smallest dimension for just covering the processing region and is formed by a portion of the grid points of the hexagonal grid and extra grid points, each of the extra grid points being newly added at the center of a pair of neighboring hexagonal grid points in a horizontal or a vertical direction. For instance, as shown in FIG. 6, denser grids, i.e., triangular grids 61 and 63, are generated for the processing regions A' and B'. And then grid information representing the position data for each of the triangular grids, e.g., the upper left pixel positions and the sizes of the respective triangular grids, is provided to the entropy coder 107 and a feature point definition block 318 via line a L18. At the feature point definition block 318, a number of feature points are selected from the pixels contained in the reference frame.

Figure 7:
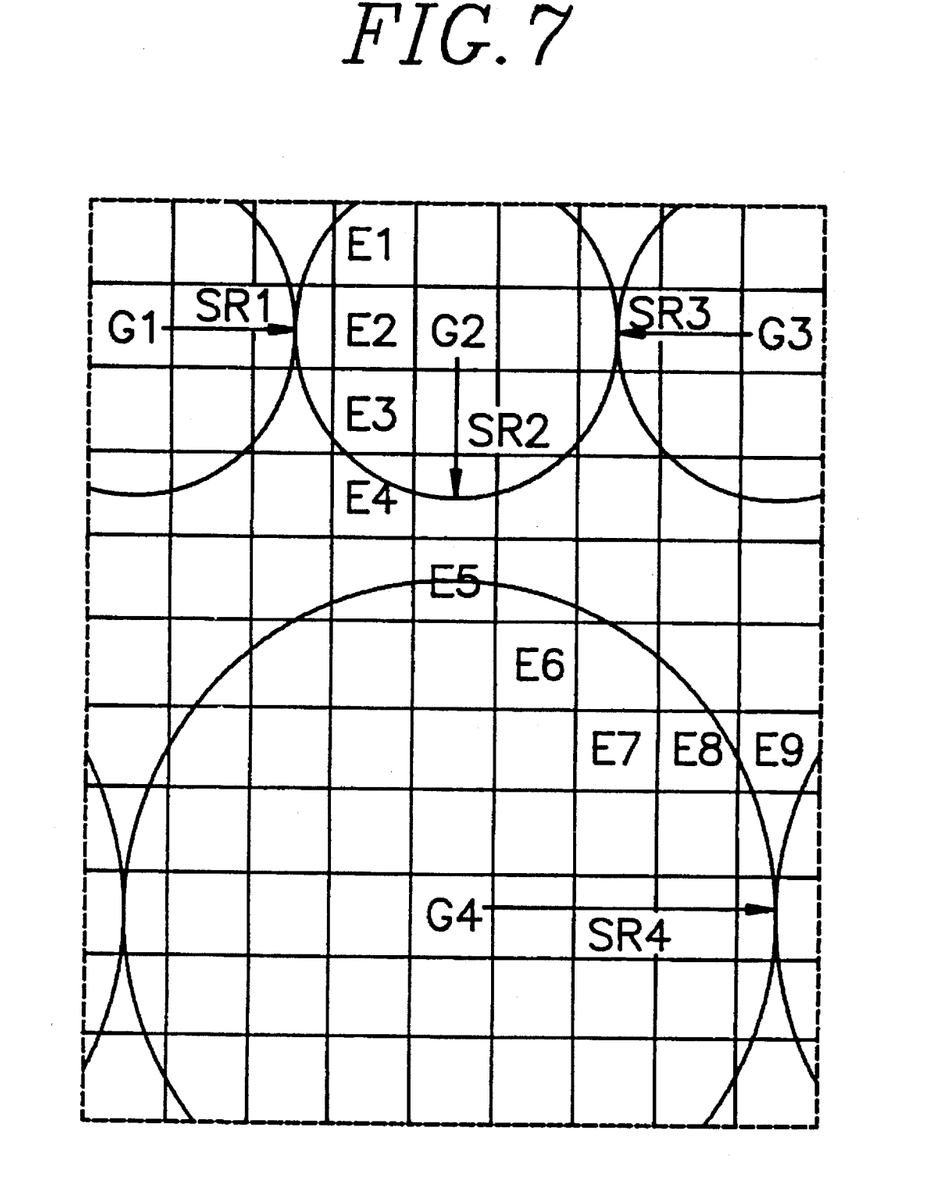
FIG. 7 illustrates an explanatory diagram for showing the feature point selection operation in accordance with the present invention.

Referring to FIG. 7, there is shown an explanatory diagram depicting the feature point selection process carried out at the feature point definition block 318 in accordance with the present invention. In response to the grid information from the grid point generation block 317, the largest and non-overlapping circular search ranges, e.g., SR1 to SR4, are set for the respective grid points therein, e.g., G1 to G4. Thereafter, based on the gradient magnitudes for the edge points and the edge signal representing the positions of the edge points from the edge detection block 315, a block of, e.g., 5×5 pixels, having an edge point at the center thereof is set up for each of the edge points, e.g., E1 to E9, which overlaps with the search ranges. The gradient magnitudes of the pixels included in each of the blocks are then summed up and the summation value obtained is assigned as the edge value for the edge point at the center thereof; and the edge point having the maximum edge value in a search range is selected as the feature point of the search range. If more than one edge point with an equal maximum edge value exit, then the edge point nearest to the grid point is selected as the feature point. And if no edge points are included in a search range, e.g., SR1 or SR3, the grid point itself, e.g., G1 or G3, included in the search range is selected as a feature point.

Referring back to FIGS. 2 and 3, the feature point information regarding the positions of the selected feature points from the feature point definition block 318 is inputted to the feature point motion vector detection block 212 and a current frame motion vector detection block 214. The current frame signal on the line L10 and the reference frame signal on the line L12 are provided to the feature point motion vector detection block 212 as well.

At the feature point motion vector detection block 212, a first set of motion vectors for the selected feature points is detected. Each of the motion vectors in the first set represents a spatial displacement between a feature point in the reference frame and a most similar pixel thereto in the current frame. After detecting the motion vectors for all of the feature points, the first set of motion vectors is provided to the current frame motion vector detection block 214 and the entropy coder 107(shown in FIG. 1) via the line L17.

At the current frame motion vector detection block 214, a second set of motion vectors for all of the pixels in the current frame is determined through the use of the first set of motion vectors and the feature point information from the feature point selection block 210. In order to determine the second set of motion vectors, first, a set of vectors for "quasi-feature points", which represent the pixel points of the current frame shifted from the feature points of the reference frame by the first set of motion vectors, are determined. The magnitude of a motion vector for a quasi-feature point is identical to the motion vector for its corresponding feature point but the direction of the two motion vectors is opposite. After determining the motion vectors for all of the quasi-feature points, motion vectors for non-quasi-feature points, which are the remaining pixel points in the current frame, are determined as follows.

First of all, a plurality of non-overlapping polygons, e.g., triangles, are defined by the line segments connecting the quasi-feature points. And then, a predicted position on the reference frame for each pixel contained in each polygon of the current frame is determined based on the positional relationships between the quasi-feature points forming said each polygon and their corresponding feature points. Thereafter, a motion vector for said each of the pixels in the current frame is determined from a displacement between the pixel and its prediction. The determined second set of motion vectors is provided to a motion compensation block 216 to predict the current frame on a pixel-by-pixel basis. This technique is described, for example, in a commonly owned copending application, U.S. patent application Ser. No. 08/434,808, filed on May 4, 1995, entitled "METHOD AND APPARATUS FOR ENCODING/DECODING A VIDEO SIGNAL", which is incorporated herein by reference.

Another example of the video signal encoding apparatus which is adapted to determine the motion vectors for the non-quasi-feature points is disclosed in a commonly owned copending application, U.S. patent application Ser. No. 08/367,520, filed on Dec. 30, 1994 and entitled "METHOD AND APPARATUS FOR ENCODING A VIDEO SIGNAL USING PIXEL-BY-PIXEL MOTION PREDICTION", which is also incorporated herein by reference. In the referenced video signal encoding apparatus, a motion vector for the non-quasi-feature point is determined by averaging the motion vectors for the quasi-feature points which are placed within a circle boundary having a radius defined by the summation of the distance to the nearest quasi-feature point from the pixel position and a predetermined expanded radius for including other feature points to be used in calculating the motion vector.

The motion compensation block 216 retrieves each value of the pixels to be contained in the predicted current frame from the second frame memory 124 by using each of the motion vectors contained in the second set, thereby providing the predicted current frame signal to a subtractor 102 and an adder 115 shown in FIG. 1 via the line L16.

Figure 8:
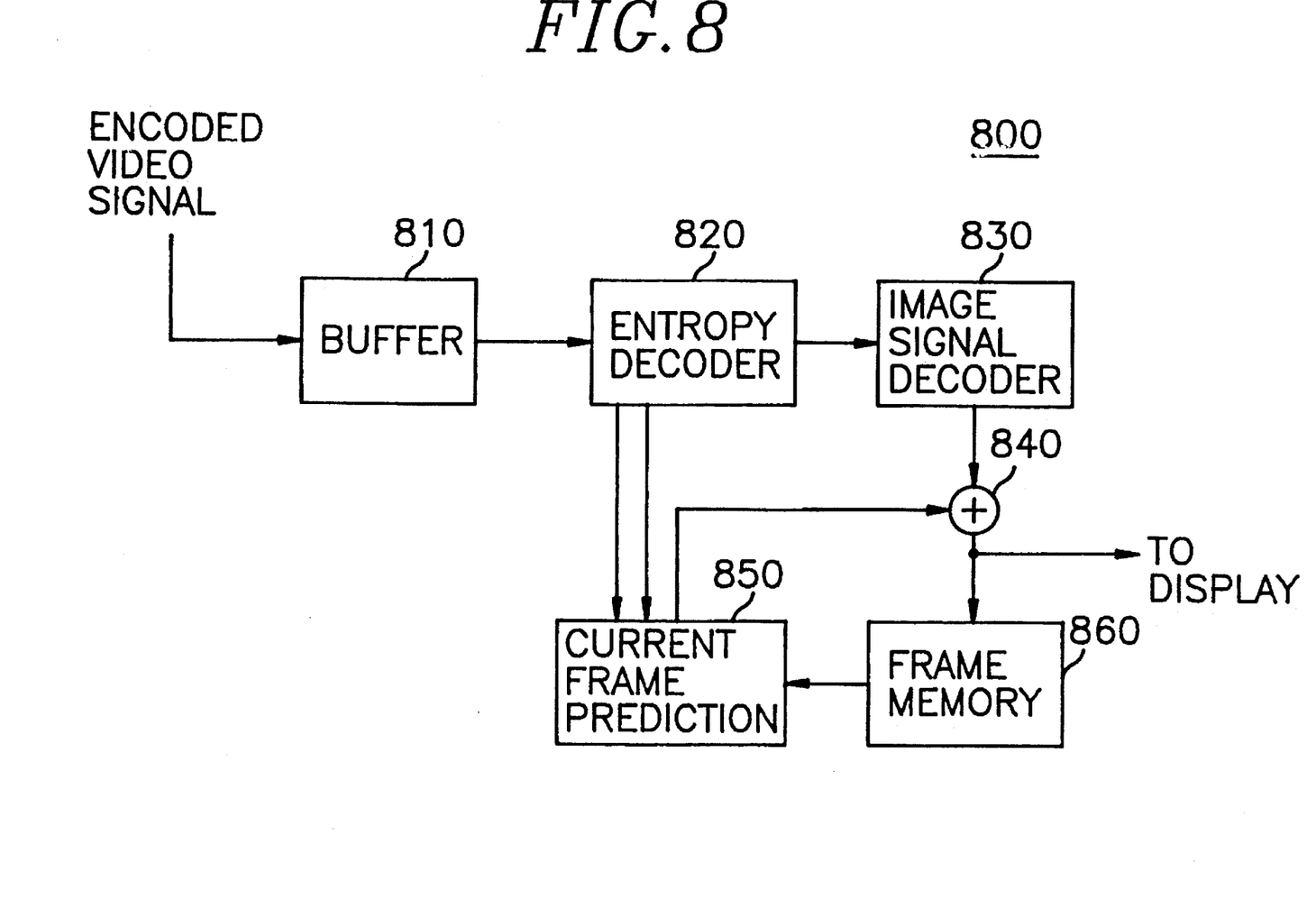
FIG. 8 offers a block diagram of a video signal decoding apparatus in accordance with the present invention.

Referring to FIG. 8, there is illustrated a video signal decoding apparatus 800 corresponding to the video signal encoding apparatus 10 shown in FIG. 1 of the present invention. An encoded video signal transmitted from the video signal encoding apparatus 10 is fed to an entropy decoder 820 through a buffer 810. Then, the entropy decoder 820 decodes the encoded video signal to provide the feature point motion vectors and the grid information to a current frame prediction block 850; and the quantized transform coefficients to the image signal decoder 830. The image signal decoder 830 performs the same function as the image signal decoder 113 of the video signal encoding apparatus 10, thereby providing the reconstructed error signal to an adder 840. The current frame prediction block 850 is of a similar structure to that of the current frame prediction block 150 shown in FIG. 2 excepting that there is no motion estimator such as the feature point motion vector detection block 212 shown in FIG. 2, because the feature point motion vectors from the encoder 10 are provided thereto through the entropy decoder 820. The current frame prediction block 850 includes a feature point selection block, a current frame motion vector detection block and a motion compensation block whose functions are similar to those explained with respect to the current frame prediction block 150 above.

Figure 9:
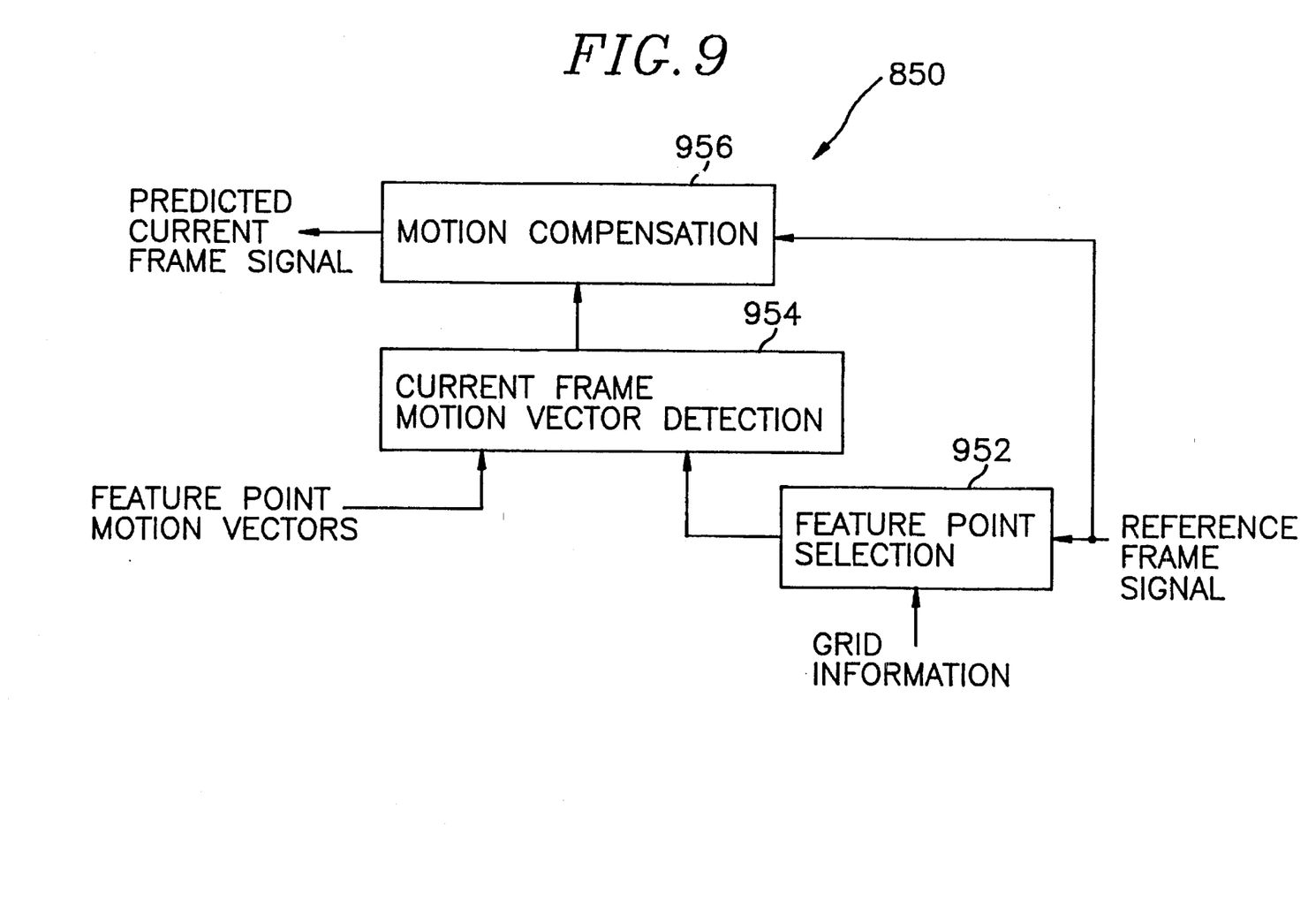
FIG. 9 represents a detailed block diagram of the current frame prediction block shown in FIG. 8.

Specifically, as shown in FIG. 9 which illustrates the details of the current frame prediction block 850, the grid information from the entropy decoder 820 and a reference frame signal from a frame memory 860 are inputted to a feature point selection block 952 to select a number of feature points, which are identical to those selected at the feature point selection block 210 shown in FIG. 2 wherein the feature point selection block 952 includes an edge detection block and a feature point definition block which are identical to those included in the feature point selection block 210 of the encoder. In response to the feature point information denoting the positions of the selected feature points from the feature point selection block 952 and the feature point motion vectors from the entropy decoder 820, the current frame motion vector detection block 954 determines the motion vectors for all the pixels contained in the current frame in a same manner as is done at the current frame motion vector detection block 214 shown in FIG. 2. The motion compensation block 956 provides the predicted current frame signal which is the same as that from the motion compensation block 216 shown in FIG. 2.

Referring back to FIG. 8, the predicted current frame signal from the current frame prediction block 850 and the reconstructed error signal from the image signal decoder 830 are added together at the adder 840 to provide the reconstructed current frame signal to a display unit(not shown) and to the frame memory 860. At the frame memory 860, the reconstructed current frame signal is stored as the reference frame signal for a next frame to be decoded.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in a video signal encoder for encoding a digital video signal based on a feature point-based motion estimation technique, said digital video signal having a plurality of frames including a current frame and a reference frame, for adaptively selecting feature points according to motions of objects between the current frame and the reference frame, comprising:

(a) detecting a motion vector for each pixel in the current frame between the current frame and the reference frame;

(b) providing a pixel value from the reference frame based on the motion vector for each pixel in the current frame;

(c) subtracting the pixel value provided from the reference frame from a pixel value of said each pixel of the current frame to thereby provide a differential pixel value;

(d) comparing on a pixel-by-pixel basis the differential pixel value with a threshold value TH and selecting one or more regions, each of the selected regions consisting of the pixels having their respective differential pixel values larger than the threshold value TH;

(e) shifting the pixels within the selected regions to positions indicated by their respective motion vectors to thereby provide shifted regions;

(f) detecting edge points from the reference frame;

(g) determining none or more processing regions from the shifted regions, wherein the processing regions are the shifted regions which overlap with a portion of the edge points;

(h) generating a first grid on the reference frame and generating a second grid for each of the processing regions, wherein the second grid is formed by a portion of grid points of the first grid and newly added grid points, each of the newly added grid points being positioned at the center of a pair of neighboring grid points of the first grid in a horizontal or a vertical direction; and (i) selecting, as the feature points, a multiplicity of pixels in the reference frame based on the first and the second grids and the edge points.

2. The method in accordance with claim 1, wherein said step(f) for detecting the edge points includes the step of generating a gradient magnitude for each pixel in the reference frame; and said step(i) of selecting the feature points includes the steps of:

(i1) assigning a non-overlapping search range for each of the grid points of the first and the second grids;

(i2) providing an edge value for each of the edge points, wherein the edge value is obtained by summing up the gradient magnitudes of the pixels within a block of pixels including said each of the edge points; and (i3) determining, as a feature point, each grid point which includes none of the edge points within its search range and each edge point having a largest edge value among one or more edge points within a search range, thereby providing the feature points.

3. The method in accordance with claim 2, wherein said step(a) of detecting the motion vector is carried out through the use of a block-matching technique.

4. The method in accordance with claim 2, wherein the first and the second grids are hexagonal and triangular grids, respectively.

* * * * *